(12) United States Patent
Beckler et al.

(10) Patent No.: US 6,277,780 B1
(45) Date of Patent: Aug. 21, 2001

(54) PREPARATION OF PHOSPHORUS-TREATED ACTIVATED CARBON COMPOSITION

(75) Inventors: Robert K. Beckler, Lexington, VA (US); James R. Miller, Mt. Pleasant, SC (US)

(73) Assignee: Westvaco Corporation, New York, NY (US)

( * ) Notice: Subject to any disclaimer, the term of this patent is extended or adjusted under 35 U.S.C. 154(b) by 0 days.

(21) Appl. No.: 08/287,866

(22) Filed: Aug. 9, 1994

(51) Int. Cl.$^7$ ................ B01J 21/18; C09C 1/44
(52) U.S. Cl. .............. 502/180; 502/425; 502/426; 502/416; 502/417; 423/299; 423/322; 423/323; 423/445 R; 423/460
(58) Field of Search ................. 502/180, 425, 502/426, 416, 417; 423/299, 322, 323, 445 R, 460

(56) References Cited

U.S. PATENT DOCUMENTS

| | | | |
|---|---|---|---|
| 2,580,647 | * | 1/1952 | Bielawski . |
| 2,584,102 | * | 2/1952 | Mavity . |
| 4,584,405 | * | 4/1986 | Vanderpool ............ 564/479 |
| 5,102,855 | * | 4/1992 | Greinke et al. .......... 502/425 |
| 5,162,286 | * | 11/1992 | MacDowell ............ 502/425 |
| 5,202,302 | * | 4/1993 | De La Pena et al. ...... 502/425 |
| 5,206,207 | * | 4/1993 | Tolles ................ 502/425 |
| 5,238,470 | * | 8/1993 | Tolles ................ 502/416 |
| 5,250,491 | * | 10/1993 | Yan .................. 502/425 |
| 5,304,527 | * | 4/1994 | Dimitri ............... 502/416 |
| 5,416,056 | * | 5/1995 | Baker ................ 502/425 |

* cited by examiner

Primary Examiner—Elizabeth D. Wood
(74) Attorney, Agent, or Firm—Terry B. McDaniel; Daniel B. Reece, IV

(57) ABSTRACT

Disclosed is a method for preparing a phosphorus treated activated carbon composition suitable for use as a catalyst support, a catalyst, and an adsorbent. The invention method involves treating (e., mixing or impregnating) an activated carbon material having a surface area greater than 100 m$^2$/g with a phosphorus-containing compound, drying, and heating to a temperature of from 450° C. to about 1200° C., wherein the resulting composition is characterized by a phosphorus compound combined with the carbon in an amount of from above 2.5% to about 10% phosphorus, based on the weight of the composition.

12 Claims, 1 Drawing Sheet

PREPARATION OF PHOSPHORUS-TREATED ACTIVATED CARBON COMPOSITION

BACKGROUND OF THE INVENTION

1. Field of the Invention

The present invention relates to a novel material useful as a catalyst support, a catalyst, and an adsorbent and a method for preparing same. The invention particularly relates to activated carbon and phosphorus-based compounds which are mixed with or impregnated throughout the carbon and then heat-treated to form novel carbon compositions. The invention also relates to use of the carbon-based composition in a wide range of catalytic applications, particularly as a substrate for supporting one or more metal catalytic compounds. Additionally, the novel composition alone is anticipated to be useful as a catalyst or as an adsorbent material.

2. Description of Prior Art

Activated carbon is a well-established material for use as a catalyst support or as a catalyst in its own right. As a support, its network of internal pores provides a high surface area accessible for the dispersion of catalytically active agents. Commercial examples include carbon-based noble metal catalysts for hydrogenation and carbon-supported mercuric chloride catalysts for production of vinyl chloride. Aside from performance, a practical advantage with activated carbon, compared to other catalyst supports such as ceramic materials (silicon dioxide, aluminum oxide, etc.), is the ability to burn off the carbon support as a means of recovering high-value catalyst metals and minimizing a solid waste disposal problem.

In large-scale catalytic petroleum refining processes, however, ceramic catalyst supports are predominantly utilized as in the case of commercially available hydroprocessing catalysts, for example, most of which use aluminum oxide (alumina) supports.

It is known in the catalyst support art that phosphorus can be added in alumina-based systems as a promotor or modifier of catalytic properties. U.S. Pat. No. 3,969,273, for example, teaches a method for mixing a solubilized phosphorus-containing compound such as phosphoric acid or ammonium phosphate with powdered alumina, extruding the mixture, and calcining to produce catalyst supports containing between 1 and 10% phosphate. U.S. Pat. No. 4,629,717 discloses a novel phosphorus-containing alumina produced by incorporating a phosphorus-containing compound into an alumina hydrosol mixture, gelling the admixture, drying, and calcining to produce catalyst supports containing a molar ratio of phosphorus to aluminum of from 1:1 to 1:100.

Phosphorus also can be incorporated in ceramic-based catalysts during the addition of catalytic agents, as in the case of U.S. Pat. No. 4,810,687 where a solubilized mixture of one or more metal salts and a phosphorus-containing compound are added to alumina hydrogel. The mixture is extruded, dried, and then calcined to produce the catalyst. The catalyst is reported as useful for hydroprocessing and other applications.

The utility of activated carbon as an alternative catalyst support for catalytic refining of petroleum is disclosed in U.S. Pat. No. 3,997,473. A cobalt-molybdenum dispersion on activated carbon containing about 580 $m^2/g$ surface area is described to exhibit high hydrodesulfurization activity towards petroleum residues. Unlike the present invention, this catalyst support and resultant catalyst do not contain a phosphorus-based additive to modify catalytic performance.

U.S. Pat. No. 2,580,647 discloses a method for producing a phosphate-laden carbon for catalytic applications in which a high concentration of phosphate, in excess of 25% by weight, is left imbedded within a carbon char as a consequence of heating vegetable-matter and phosphoric acid to between 200° and 650° C. As appreciated by those skilled in the art, such a process invariably results in a material with little available surface area since the chemical activant (phosphoric acid) is not removed from the internal pores of the char by washing or by other means. The present invention, on the other hand, teaches a method whereby most of the original high surface area of the activated carbon starting material is retained, as a consequence of impregnating the activated carbon with a controlled amount of at least one phosphorus-containing compound, followed by heat-treatment.

Some have indicated that added phosphate actually poisons carbon supported Co-Mo or Ni-Mo catalysts for hydrodesulfurization. (See Bouwens et al., "The Influence of Phosphorus on the Structure and Hydrodesulfurization Activity of Sulfided Co and Co-Mo Catalysts Supported on Carbon and Alumina," *J. Catal.*, Vol. 128, 559–568 (1991) and Eijshouts et al., "The Effect of Phosphorus on the Quinoline Hydrodenitrogenation Activity of Carbon-Supported Mo, Ni, and Ni-Mo Sulfide Catalysts," *Proceedings of the Nineteenth Biennial Conference on Carbon Jun. 25–30, 1989*, 46–47 (1989).)

There is a continuing need in the field of hydroprocessing for catalysts which exhibit improvements in hydrogenation, hydrodesulfurization, dehalogenation, etc. The implementation of stricter environmental regulations also results in a need for research to find catalysts which provide more efficient performance.

There does not appear to be any art which teaches or suggests that carbon substances of a particular surface area could be treated with phosphorus-based compounds and heat treated to result in a carbon composition containing phosphorus in an amount above 2.5% by weight of the resultant composition, and possessing most of the original high surface area of the activated carbon starting material. Neither is it known that such a carbon composition would provide desirable improvements when used alone or as a support for hydroprocessing catalysts.

SUMMARY OF THE INVENTION

Figure 1:
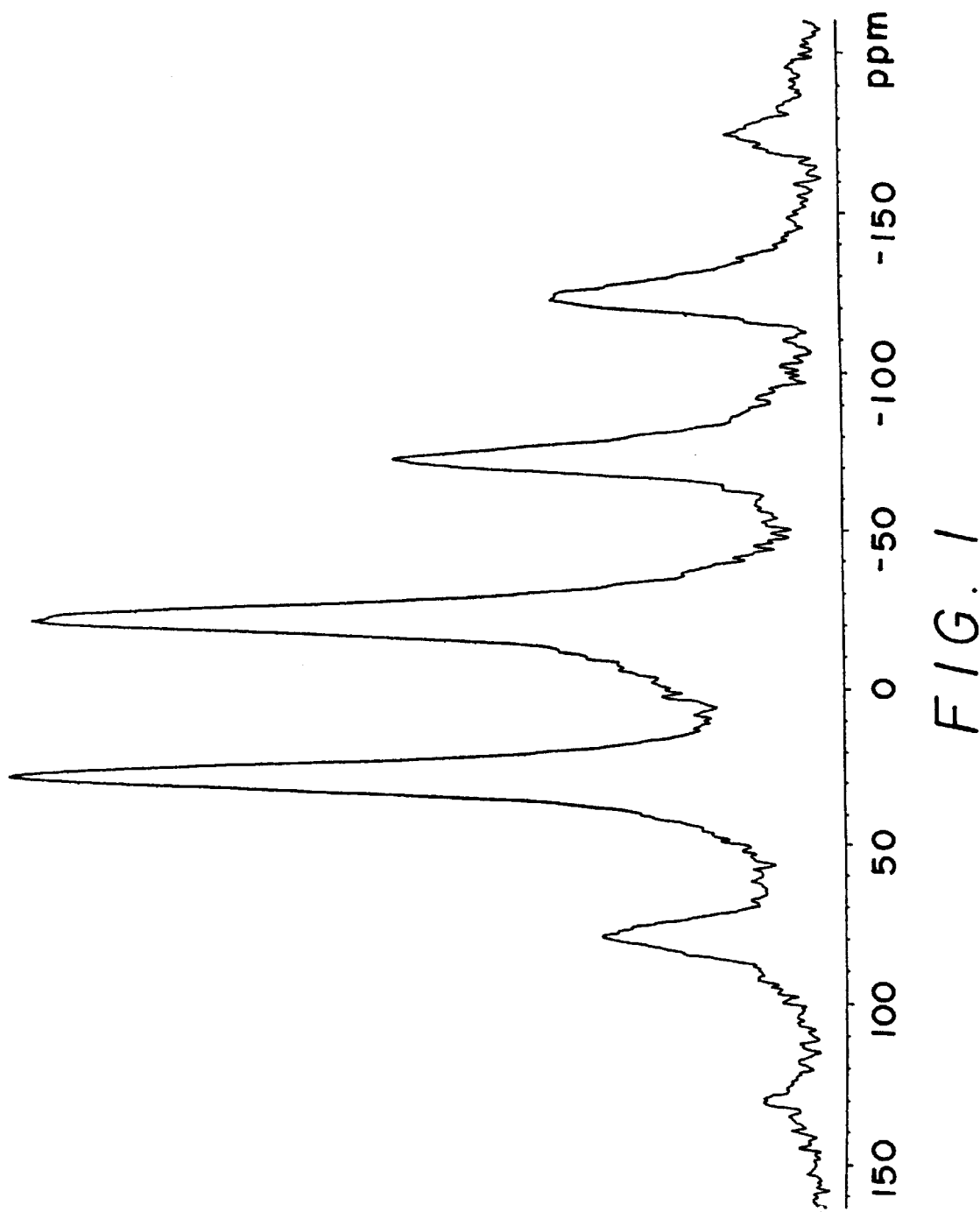
FIG. 1 shows the solid state magic angle spinning $^{31}P$ NMR spectrum of one example of the invention carbon composition.

In accordance with the foregoing, a novel carbon composition and method for its preparation has been discovered. The novel phosphorus promoted activated carbon composition comprises from above 2.5 to about 10 Wt % phosphorus bound to the carbon surface. The composition is prepared by incorporating the required amount of phosphorus compound onto the activated carbon and then heat-treating the phosphated carbon as claimed herein.

This novel activated carbon composition is useful as a catalyst support. Additionally, the novel composition may be useful alone as a catalyst and as an adsorbent material. In copending U.S. application Ser. No. (Attorney Case Docket No. 79,940), the novel and unobvious use of said carbon composition as a support for a hydroprocessing catalyst is disclosed.

DESCRIPTION OF THE PREFERRED EMBODIMENT(S)

The invention method of preparing the carbon composition described herein is comprised of incorporating corporating one or more phosphorus compounds within the internal pore structure of and onto an activated carbon material surface and then subjected to a heat-treatment. Among the methods of preparation, the heat-treated phosphorus laden carbon is achieved by either mixing a phosphorus-based compound with activated carbon or impregnating the activated carbon with an aqueous or nonaqueous solution of a phosphorus-based compound, then drying and heat-treating to a temperature of at least about 450° C. The phosphorus level in the treated carbons of the present invention can range from above 2.5% to about 10% by weight measured as elemental phosphorus, based on the final weight of the phosphorus-treated carbon. A preferable wt % of phosphorus in the final carbon composition is from about 2.75% to about 8.0%, and more preferably from about 3.0% to 7.0% phosphorus by weight.

Any activated carbon material with a B.E.T. surface area of more than 100 $m^2/g$ can be used in preparing the phosphorus-treated carbon composition of the present invention. A more useful range for the B.E.T. surface area is greater than 250 $m^2/g$ and preferably greater than 500 $m^2/g$.

Activated carbon can be produced from a wide range of natural and synthetic precursor materials including but not limited to bituminous coal, lignite, coconut shell, wood, olive pits, peat, synthetic polymers, petroleum pitch, petroleum coke, and coal tar pitch.

Carbon is generally characterized as "activated" if it contains an intricate network of internal porosity as a consequence of the activation process. Activation processes, generally classified as either "chemical" or "thermal," control the resultant surface area, pore volume, pore size distribution, and surface chemistry of activated carbon products. (See Baker et al., "Activated Carbon," *Kirk-Othmer Encyclopedia of Chemical Technology*, 4th Ed., Vol. 4, 1015–1037 (1992).)

The activated carbon used in this invention can exist in any physical form including but not limited to powder, granules, pellets, fibers, monoliths, extrudates, and spheres. The activated carbon starting material can contain either small concentrations of phosphorus (up to 2.5% by weight) as may be the case in activated carbons produced by chemical activation processes which use phosphorus-based reagents. In the case of carbon materials activated by other means, the carbon can contain trace levels of phosphorus (on the order of 0.1% by weight or less) due to the presence of phosphorus-bearing compounds within the raw material utilized in the activation process, or the activation carbon starting material can be phosphorus free.

Likewise, the activated carbon used in this invention can exist as composites of activated carbon with minor amounts (less than 30% by weight) of any inorganic oxide such as alumina, silica, titania, and mixtures thereof.

The phosphorus-treated carbon of the present invention is prepared by incorporating into the activated carbon starting material one or more phosphorus-based compounds including, but not limited to, ammonium dihydrogen phosphate, diammonium hydrogen phosphate, sodium dihydrogen phosphate, dipotassium hydrogen phosphate, meta phosphoric acid, polyphosphoric acid, triethyl phosphate, aniline phosphate, urea phosphate, phosphoric acid, phosphorus acid, hypophosphorus acid, phosphorus pentoxide, and pyrophosphoric acid and heattreating the resultant mixture. Addition by impregnation of the activated carbon with solution can be carried out by dissolving the phosphorus-based compound and impregnating the carbon to the point of partial saturation with solution, or to the point of incipient wetness. Alternatively, the carbon material can be thoroughly mixed with the phosphorus-based compound in a solid or slurry state. Phophorous based compounds also can be incorporated into the activated carbon starting material through vapor phase, using suitable phosphorus compounds.

In the cases of solution impregnation and slurry addition, the wet carbon can be dried in a separate step prior to heat treatment, or the conditions employed in the heat treatment step can be applied to effect drying. The activated carbon/phosphorus compound mixture can be subjected to the heat treatment immediately after impregnation, or can be stored indefinitely prior to heat treatment. The mixture can also be subjected to intermediate processing steps in which the mixture is formed into new shapes such as granules, pellets, extrudates, monoliths, and spheres, prior to heat treatment. Forming processes include those which require the addition of binders to assist in particle shaping and/or contribute to final product strength properties such as abrasion resistance and crush strength.

The heat treatment step requires subjecting the activated carbon/phosphorus compound mixture to a temperature from about 450° C. to about 1200° C., preferably in the range of 550° C. to 1100° C., more preferably in the range of 650° C. to 1000° C., in an atmosphere which is either inert (nitrogen, argon, helium, etc.) or contains oxygen, carbon dioxide, steam and/or other components, for instance that might be expected in atmospheres generated by the combustion of fuels. The heat treatment step can hold the material at the desired temperature for any duration, although simply heating to the desired temperature level without a holding period can be sufficient for achieving the desired properties of the present invention.

While the benefits of the heat treatment are understood to be critical to the invention, the specific effects of such treatment are not entirely understood. One possible theory is that the treatment converts a major portion of the phosphorus to polyphosphate species bound to the carbon surface which contribute to the special performance characteristics of this novel carbon composition as a carbon support or for other uses. Such polyphosphate species may be characterized by peaks between –5 and –30 ppm in their $^{31}P$ magic angle spinning solid state nuclear magnetic resonance spectrum. As shown in FIG. 1, the peaks due to these phosphorus species also have characteristic spinning side bands due to a large chemical shift anisotropy.

The carbon-based catalyst support is suitable for use in a wide range of catalytic applications including use as a substrate for supporting metal catalyst compounds, as a catalyst in its own right, or as an adsorbent.

As a catalyst support, the phosphated carbon of the present invention can be used as an effective catalyst support for transition metals, metal halides, metal sulfated, metal carbonates, metal oxides, and metal sulfides. As such, catalysts supported on the novel carbon compositions should be useful in processes such as, but not limited to, hydrogenation, selective hydrogenation, dehalogenation, and hydroprocessing.

As a catalyst and as a catalyst support, the novel carbon composition should be useful for reactions such as alkylation, transalkylation, dealkylation, isomerization, hydrogenation, dehydrogenation, dehydrocyclization, cracking, hydrocracking, hydrogen transfer, dewaxing, oligomerization, aromatization, halogenation, dehalogenation, dehydrohalogenation, oxydehydrogenation, oxidative coupling, meta thesis, oxidation, reduction, gold recovery, esterification, etherification, carbonylation, decarbonylation, hydroformylation, demetallization, hydration, dehydration, selective oxidation, and hydrodehalogenation. The phosphated carbon compositions of the present invention may act as a catalyst for some reactions just by providing a high surface area which facilitates the adsorption and reaction of the reactants thereupon.

Possible applications as an adsorbent would include, but are not limited to, removal of hydrocarbons or other solvents, ammonia or other alkaline compounds, toxic chemicals such as phosgene, pollutants such as sulfur and nitrogen oxides, halogenated compounds, or other liquid or gaseous compounds. In general, the novel carbon composition can be utilized as an absorbent in any application known in the art for which a normal activated carbon is used.

The present invention is further described by the following examples which are provided for illustration purposes and are not intended to limit the scope of this invention.

EXAMPLE 1

A phosphorus-treated carbon catalyst support was prepared according to the following procedure.

The activated carbon selected for catalyst support preparation as described in this example was a 2 mm pelletized version of NUCHAR BX carbon, a commercially available wood-based activated carbon manufactured by Westvaco Corporation. This activated carbon possessed a B.E.T. surface area of 1290 $m^2/g$, and contained a 2.2% by weight level of residual phosphorus inherent in this material as a result of its chemical-based manufacturing process.

Prior to adding the phosphorus-based compound to the activated carbon, a determination was made of the carbon's capacity for saturation with water to the point of incipient wetness. A 5.0 gram sample of the activated carbon (wet basis weight, containing 2% moisture) was weighed out and placed into a 100 ml beaker. Distilled water at ambient temperature was added dropwise to the carbon while stirring with a spatula. The point at which no further water could be absorbed into the internal structure of the carbon particles, as determined by visual observation of surface wetting, was defined as the saturation point. In this case, this activated carbon sample absorbed 1.0 grams of water per gram of carbon.

A solution was prepared by mixing 221 grams of 85.7% phosphoric acid ($H_3PO_4$, Mallinckrodt) with demineralized water at ambient temperature to produce a resultant solution with a volume of 816 ml containing a 21 weight % concentration of $H_3PO_4$.

A 1000 gram quantity of the 2 mm activated carbon was placed into a batch rotary mixer consisting of a 28 cm diameter×35 cm deep drum tilted at approximately 30° from the horizontal. The quantity of carbon was determined from the previously described water saturation point, such that impregnation with the total volume of solution would approach the incipient wetness point for the carbon. Sufficient bed turnover was achieved by operating the mixer at a drum speed of 32 RPM. Using a spray bottle, the phosphorus-based compound solution was added to the carbon by directing the spray mist directly into the tumbling bed. Over a period of 12 minutes the complete volume of solution was added to the carbon. The bed was permitted to continue mixing for an additional 10 minutes after the solution had been added.

The solution-impregnated carbon was dried by treating the material in a forced-air, batch oven for 1 hour at ambient temperature, and then for 16 hours at 100° C.

The dried material was then subjected to a heat-treatment step. This was accomplished by loading the material into a batch, indirectly-heated rotary kiln (19 cm in diameter×122 cm in length) which was preheated to a temperature of 890° C. A blanketing gas containing 9.5% carbon dioxide, 19% steam, and the balance nitrogen was passed through the kiln at a rate of 60 liters/min (STP). After charging to the kiln, the material was heated to a temperature of 870° C. over a 15 minute period. The heat-treated material was discharged into a nitrogen-purged container and allowed to cool to ambient temperature.

Chemical analysis of this product by wet oxidative digestion followed by analysis for $H_3PO_4$ found a weight concentration of 5.8%, expressed as elemental phosphorus. The phosphorus-treated carbon had a B.E.T. surface area of 1020 $m^2/g$ and NMR peaks characteristic of polyphosphate species as shown in FIG. 1.

EXAMPLE 2

Another phosphorus-treated carbon catalyst support was prepared from the same activated carbon starting material as described in EXAMPLE 1, using a procedure similar to that described in EXAMPLE 1 with the following exception.

The solution for this preparation was made by mixing 72.8 grams of 85.7% phosphoric acid with demineralized water to produce a solution containing 8.2 wt. % $H_3PO_4$ and a final volume of 727 ml. This solution was sufficient to impregnate 900 grams of the same activated carbon starting material as described in Example 1.

Following impregnation, drying, and heat-treatment steps similar to those described in Example 1, a product containing a 4.0% phosphorus weight concentration was obtained. This phosphorus-treated carbon had a B.E.T. surface area of 1160 $m^2/g$.

EXAMPLE 3

This example describes the preparation of a phosphorus-treated carbon catalyst support using the same activated carbon material as described in Example 1 and a procedure similar to that described in Example 1, with the following exceptions.

The solution was prepared by mixing 125 grams of 85.7% phosphoric acid solution with demineralized water to produce a solution containing 13.8 wt. % $H_3PO_4$ and a final volume of 727 ml.

The heat treatment procedure was similar to that described in Example 1, except that final treatment temperature of the charge was 760° C.

A product containing 5.3% by weight phosphorus was obtained. This carbon possessed a B.E.T. surface area of 1100 $m^2/g$.

EXAMPLE 4

The present invention is described in this example to show employment of the invention method using a different starting material to produce the invention product. Thus, a phosphorus-treated carbon was prepared using XTRUSORB 700, a coal-based 4 mm pelletized activated carbon commercially available from Calgon Carbon Corporation. This activated carbon possessed an initial B.E.T. surface area of 1120 $m^2/g$ and contained no measurable level of phosphorus. Other steps in preparing the phosphorus treated carbon composition were the same as described in Example 1, with the following exceptions.

The impregnating solution was prepared by mixing 187 grams of 85.7% phosphoric acid with demineralized water to produce a final volume of 504 ml. Using the same technique as described in Example 1, this carbon was found to possess an incipient wetness capacity of 0.56 grams of water per gram of carbon. Therefore, the solution volume was sufficient to impregnate 900 grams (dry basis weight) of the activated carbon starting material.

Following drying and heat treatment steps similar to those described in Example 1, a product was obtained with a phosphorus compound loading corresponding to 3.5% on an elemental phosphorus basis. This product had a B.E.T. surface area of 1030 m$^2$/g.

EXAMPLE 5

One or more samples of the activated carbons prepared as disclosed in Examples 1–4 were evaluated in a separate investigation which included catalyst formation by loading the carbon/polyphosphate material with metal(s) and testing in hydroprocessing applications. The resultant catalysts performed in a surprising and unexpected manner in that their measured catalyst activity was significantly greater than catalysts prepared using conventional catalyst supports, as disclosed in U.S. patent application Ser. No. (Attorney Case Docket No. 79,940), filed of even date.

This improved catalyst performance is directly attributable to the novel phosphate treated activated carbon support prepared as claimed herein.

What is claimed is:

1. A method for preparing an activated carbon-phosphorus composite consisting essentially of the steps of:

(1) impregnating activated carbon with a phosphorus containing compound;

(2) drying the impregnated activated carbon; and (3) heating the impregnated activated carbon to a temperature from about 450° to about 1200° C. to produce an activated carbon-phosphorus composite characterized by a nitrogen B.E.T. surface area greater than about 100 m$^2$/g and from about 2.5 wt % to about 10 wt % elemental phosphorus, based on the weight of the composite, wherein the phosphorus containing compound is selected from a group of compounds consisting of ammonium dihydrogen phosphate, diammonium hydrogen phosphate, sodium dihydrogen phosphate, disodium hydrogen phosphate, potassium dihydrogen phosphate, dipotassium hydrogen phosphate, triethyl phosphate, aniline phosphate, urea phosphate, phosphoric acid, phosphorus acid, hypophosphorus acid, phosphorus pentoxide, pyrophosphoric acid, and combinations thereof.

2. The method of claim 1 wherein the activated carbon material is derived from the group consisting of bituminous coal, lignite, coconut shell, wood, olive pits, peat, synthetic polymers, petroleum pitch, petroleum coke, and coal tar pitch.

3. The method of claim 1 wherein the activated carbon is impregnated with phosphorus by contacting the carbon with a solution of the phosphorus containing compound.

4. The method of claim 1 wherein the activated carbon is impregnated with phosphorus by mixing together carbon and the phosphorus containing compound in a form selected from the group consisting of a solid and a slurry.

5. The method of claim 4 wherein intermediate to the drying step and the heating step the activated carbon-phosphorus compound mixture is shaped.

6. The method of claim 1 wherein the impregnated activated carbon is heated to a temperature from about 550° C. to about 1100° C.

7. The method of claim 6 wherein the impregnated activated carbon is heated to a temperature from about 650° C. to about 1000° C.

8. The method of claim 1 wherein the impregnated activated carbon is characterized by a B.E.T. surface area of greater than 250 m$^2$/g.

9. The method of claim 1 wherein the impregnated activated carbon is characterized by from about 2.75 to about 8 wt. % phosphorus.

10. The method of claim 8 wherein the impregnated activated carbon is characterized by a B.E.T. surface area of greater than 500 m$^2$/g.

11. The method of claim 9 wherein the impregnated activated carbon is characterized by from about 3.0 to about 7 wt. % phosphorus.

12. The method of claim 1 wherein the activated carbon-phosphorus composite is further characterized by exhibiting peaks between −5 and −30 ppm in the solid state magic angle spinning $^{31}$P nuclear magnetic resonance spectrum.

* * * * *